(No Model.) 2 Sheets—Sheet 1.

J. T. WILSON.
METHOD OF MAKING DRAW BARS.

No. 389,182. Patented Sept. 4, 1888.

WITNESSES,
Wm. H. Scott.
Wm. E. Dyre.

INVENTOR,
John T. Wilson.
By Johnston, Reinohl & Dyre,
Attorneys.

(No Model.)  2 Sheets—Sheet 2.
J. T. WILSON.
METHOD OF MAKING DRAW BARS.
No. 389,182.  Patented Sept. 4, 1888.
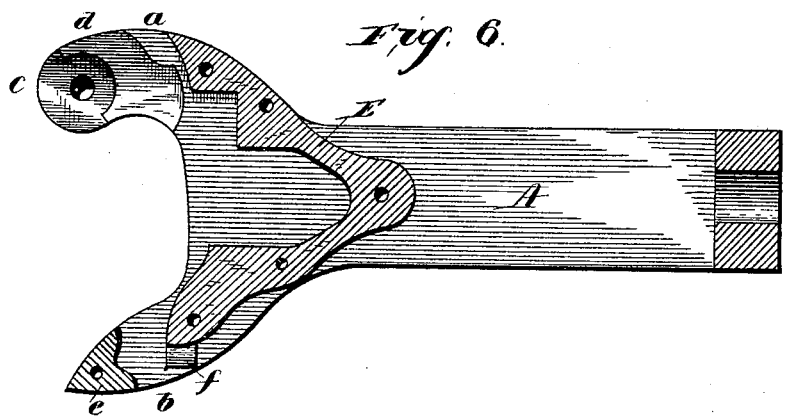
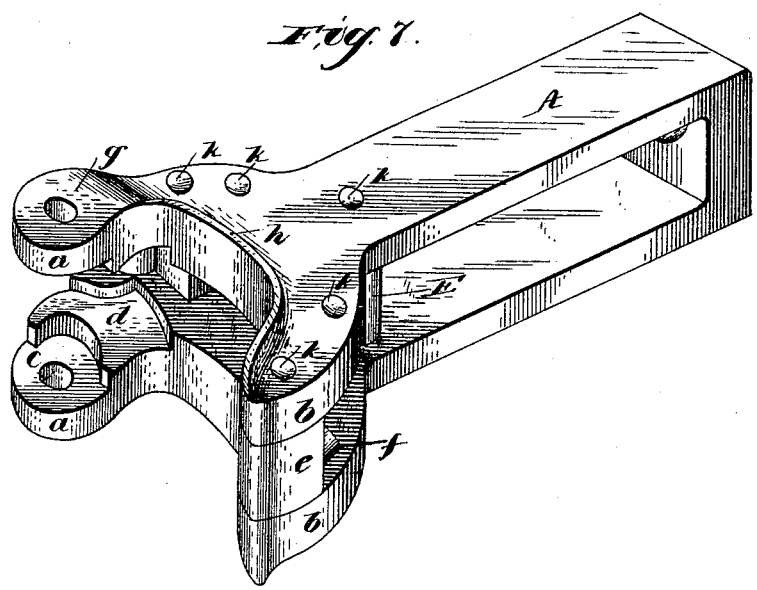
WITNESSES,  INVENTOR,

UNITED STATES PATENT OFFICE.

JOHN T. WILSON, OF PITTSBURG, PENNSYLVANIA, ASSIGNOR OF ONE-HALF TO THE PITTSBURGH FORGE AND IRON COMPANY.

METHOD OF MAKING DRAW-BARS.

SPECIFICATION forming part of Letters Patent No. 389,182, dated September 4, 1888.

Application filed June 7, 1888. Serial No. 276,347. (No model.)

*To all whom it may concern:*

Be it known that I, JOHN T. WILSON, a citizen of the United States, residing at Pittsburg, in the county of Allegheny and State of Pennsylvania, have invented certain new and useful Improvements in the Method of Manufacturing Draw-Bars; and I do hereby declare the following to be a full, clear, and exact description of the invention, such as will enable others skilled in the art to which it appertains to make and use the same.

My invention relates to the manufacture of draw-bars, and has for its object an improvement in the manufacture of the class of draw-bars which are provided with a vertical rotary coupling-hook.

The invention will be hereinafter described, and particularly pointed out in the claims.

Figure 1:
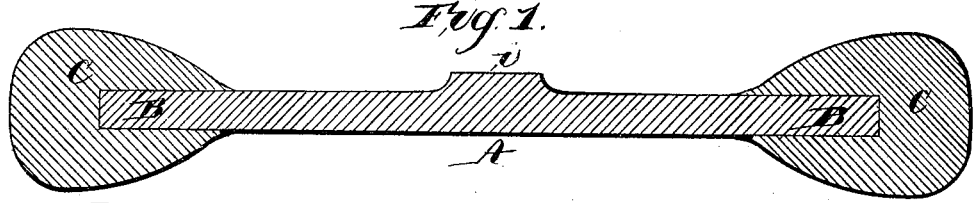
Figure 2:
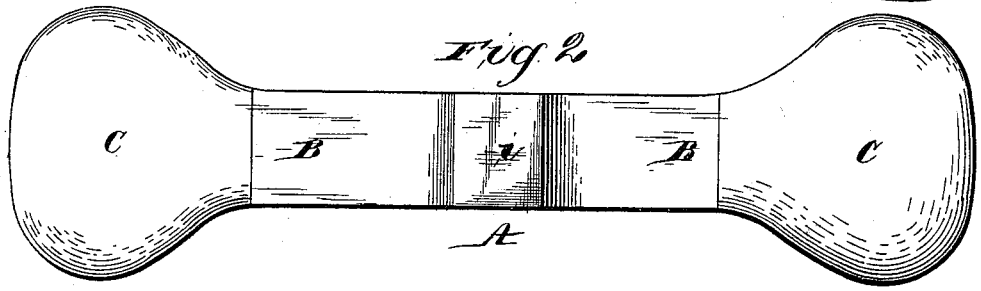
Figure 3:
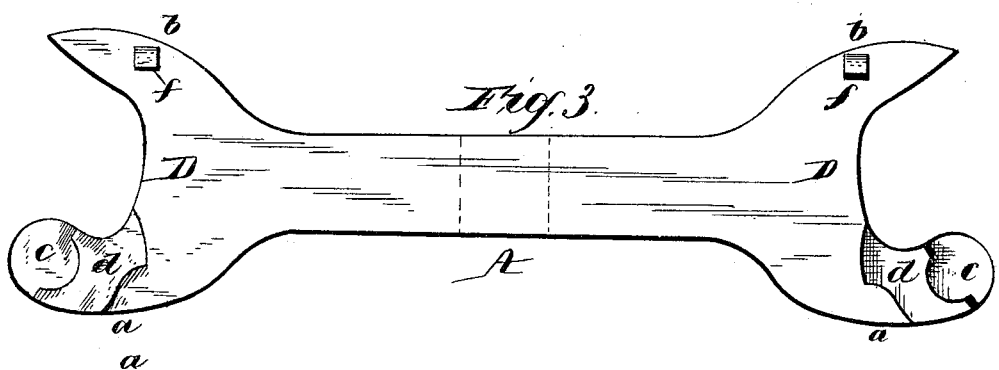
Figure 4:
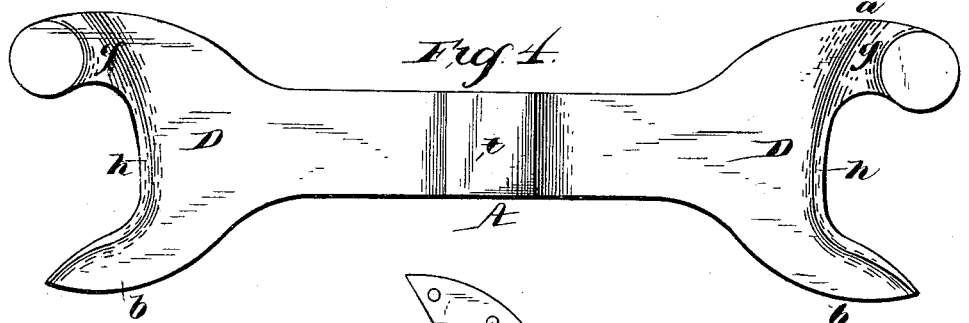
Figure 5:

In the accompanying drawings, which form a part of this specification, Figure 1 represents a longitudinal section of a bar of metal. Fig. 2 is a plan of the same. Fig. 3 is a plan showing one side of the bar after the ends have been forged into right and left semi-heads. Fig. 4 is a plan of the reverse side of the bar. Fig. 5 is a plan of a skeleton brace-block. Fig. 6 is a horizontal section of a completed draw-bar with the upper side of the skeleton body removed, and Fig. 7 is a perspective of the same.

Reference being had to the drawings and the letters marked thereon, A indicates a bar of wrought metal—such as steel or iron—which is enlarged at its ends B B by welding billets C C thereon or by piling metal on the ends and bringing it to a welding heat and forging it into a homogeneous body. In either instance the fiber of the metal should be made to run in the direction of the length of the bar, so as to present a continuous fiber of the metal in the completed draw-bar. After the billets C C have been properly welded and wrought into the bar and form an integral part thereof, they are forged into shape approximately the form shown in Fig. 3, when each end of the bar is subjected to dies substantially such as are shown in my patent, No. 381,894, bearing date of April 24, 1888, and forged or shaped into right and left semi-heads D D. These heads are each provided with arms $a\ b$, the former being provided with rabbets or seats $c\ d$, and support a rotary coupling-hook, (not shown,) and the latter constitute guard-arms, and between which a guard-block, $e$, is secured. On the inner surface of each arm $b$ are formed or secured lugs $f$, which serve as braces to the thrust of the hook while a car is being driven. The opposite or outside of each semi-head is re-enforced at $g$ to compensate for the metal displaced in forming the seats $c\ d$, and is provided with a flange or bead, $h$, common to this style of draw-bar. The bar is thickened in the center, as at $i$, and after forging and shaping the ends into semi-heads D D it is bent on each side of the center $i$ into the form shown in Fig. 7.

E indicates a skeleton brace-block, which may be forged or cast, and is inserted between the semi-heads and secured to them by welding or by bolts $k$, which pass through the completed draw-bar head and have heads formed on both of their ends. The guard-block $d$ is secured between the arms $b$ in the same manner. By this method of construction a very light skeleton draw-bar frame is made, in which the head is formed of continuous fiber of metal and great strength and durability secured.

The draw-bar is claimed in another application for a patent, Serial No. 275,649.

Having thus fully described my invention, what I claim is—

1. The improvement in the manufacture of draw-bars herein described, which consists in preparing a bar of suitable length, piling each end of the bar with metal to form a half-head, forging said ends into shape approximating a half-head, then placing one end of the bar in a die and stamping a half-head, then placing the opposite end in another die and stamping a half-head, and then heating the bar near its center and bending it to bring the half-heads opposite each other.

2. The improvement in the manufacture of draw-bars herein described, which consists in preparing a bar of suitable length, piling each end of the bar with metal to form a half-head, forging said ends into shape approximating a half-head, then placing one end of the bar in a die and stamping a half-head, then placing the opposite end in another die and stamping a half-head, then heating the bar near its center and bending it to bring the half-heads opposite each other, then inserting a skeleton brace-block between said heads, and securing the whole together.

In testimony whereof I affix my signature in presence of two witnesses.

JOHN T. WILSON.

Witnesses:
S. H. FRENCH,
F. E. RICHARDSON.